Sept. 12, 1933.   DE NERA A. COTTON   1,926,330
DIAMOND SETTING AND METHOD OF MAKING THE SAME Filed Nov. 7, 1930

INVENTOR
DE NERA A. COTTON.
BY
 ATTORNEYS

Patented Sept. 12, 1933

1,926,330

UNITED STATES PATENT OFFICE 1,926,330

DIAMOND SETTING AND METHOD OF MAKING THE SAME

De Nera A. Cotton, Anderson, Ind., assignor to Delco-Remy Corporation, Anderson, Ind., a corporation of Delaware Application November 7, 1930. Serial No. 494,013

8 Claims. (Cl. 76—101)

This invention relates to means and the method of preparing dressing tools, and has for one of its objects the mounting of a precious stone so as to insure the same against loss.

Another of the objects of the invention is to mount a cutting stone in a tool so that it will not be loosened from its setting even under exacting conditions of use.

A further object of the invention is to securely mount stones in tools so that heat generated through their use will be readily conducted to a point remote from said stone so as to prevent the loosening and loss thereof.

Further objects and advantages of the present invention will be apparent from the following description, reference being had to the accompanying drawing wherein a preferred embodiment of one form of the present invention is clearly shown.

Figure 1:
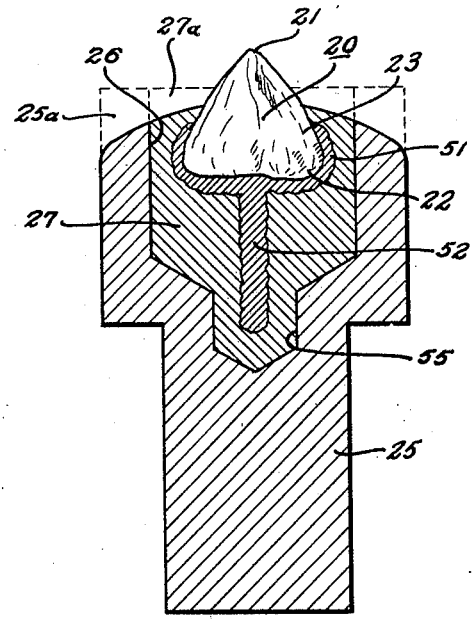
Fig. 1 is a longitudinal sectional view on a large scale of a dressing tool illustrating details of the instant invention.

With particular reference to the drawing, 20 designates a stone, preferably a diamond, forming the cutting element of a dressing tool, and for convenience of description is said to have a point of tip 21, a base 22 and a waist 23. In mounting these stones for use, there is usually provided a holder 25 that has a recess or chamber 26 for the reception of a quantity of molten metal, as zinc 27, that forms a retaining bond about the base 23 of the stone and secures it within the tool 25. For convenience of description it will be referred to as seating metal or material.

In the prior art devices of this character, the stones 20 are subject to loss due to generation of heat, while they are being used. The zinc 27 in the region of the stone softens by reason of the heat of operation, which ultimately loosens the stone from its setting, so that it is easily torn or otherwise extracted from its setting and lost.

Applicant has found that this loss can be practically eliminated by the provision of certain means including a harness of heat conducting material that will readily conduct the heat generated at the base of the stone during operation, to a portion of the holder remote from the stone base, whereby the seating metal will not be softened. This makes it more difficult to tear the stone from its setting, and practically eliminates loss from the cause mentioned.

Figure 2:
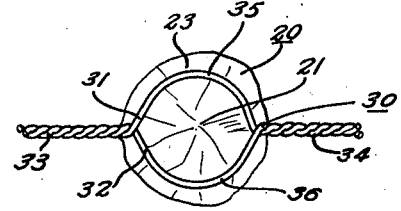
Fig. 2 illustrates in plan view a stone in the first stage of being harnessed preparatory to setting.
Figure 3:
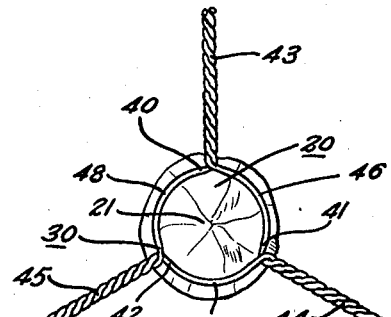
Fig. 3 is a plan view similar to Fig. 2, but illustrating a modified form of harness.
Figure 5:
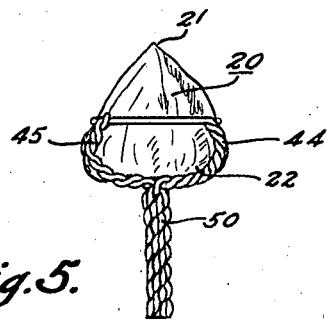
Fig. 5 illustrates a subsequent step in the harnessing of the stone preparatory to setting.

These means are accomplished in the instant invention by providing a harness 30, that is placed about the waist of the stone, and thence drawn backwardly over the base and twisted together in the form of a stem as illustrated in Fig. 5. As illustrated in Fig. 2, this harness comprises a pair of copper wires 31, 32 twisted together at their ends as at 33 and 34 their middle portions being untwisted and spread outwardly to form the loops 35 and 36 substantially encompassing the stone at its waist. In Fig. 3, a slight modification of the harness is illustrated in which three such wires 40, 41 and 42 have their ends twisted together as at 43, 44 and 45 with the intervening loops 46, 47 and 48.

Figure 4:
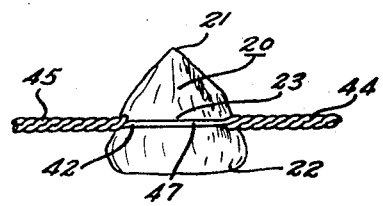
Fig. 4 is a view in side elevation showing further details in the application of the harness to the stone.

Whether the harness be formed as in Fig. 2 or Fig. 3 or otherwise, after the loops have been associated with the waist 23 of the stone, the assembly thus completed will appear somewhat as in Fig. 4, and the succeeding step is illustrated in Fig. 5 in which the twisted portions, whether they be 33, 34, or 43, 44 and 45 are bent or looped backwardly over the base 22 of the stone where they are twisted together or otherwise united to form a stem 50 of substantial size at the middle of the base opposite to the point 21 to be exposed. This presents sort of a basket like structure within which is confined the stone substantially as illustrated in Fig. 5. The stone is now ready for coating with hard copper which is accomplished in the following manner.

The stone and its harness are initially covered with a metallic deposit in any of the well known and preferred manners, which may include immersing the same in an adhesive such as varnish or the like and thence rolling in powdered metal and allowed to dry. After drying, the excess is brushed off and the harnessed stone subjected to an electro-plating bath. It is preferred that the plating process be carried on at a slow rate and to extend over a considerable length of time, so that the deposit of copper upon the coating stone and harness will be of maximum hardness and density. By this process the stone 20 then has its base substantially enclosed within a heat conducting sheath 51, a cross section of which is illustrated in Fig. 1, and this sheath will be integrally joined with the stem 50, is indicated at 52 in Fig. 1. Another desire for continuing the plating process over such a period of time, is that a considerable quantity of heat conducting metal, as copper, may be deposited about the base of the stone and over the harness, so as to provide means readily conductive of heat from the base of the stone to the end of the stem.

The stone and harness, thus electro-plated may thence be cleaned and subsequently dipped in solder, after which it is ready for mounting within the holder 25. The holder best adapted for this mounting, is substantially as illustrated in Fig. 1, in which the recess of chamber 26 has an axial extension that is preferably of much smaller magnitude as illustrated at 55, and which is designed to receive the end of the stem 52. In mounting the harnessed stone within the holder, it is customary to add a quantity of flux to the chamber 26 and heat the holder to a fairly high temperature, some few degrees lower than the melting point of the seating metal 27 so as to prepare a good bond for the seating material, and thence the cavity is substantially filled with the seating metal in molten condition. The harnessed stone is then set in place substantially as illustrated in Fig. 1, and so that the stem 52 is positioned in the chamber 55, while the working point of the stone protrudes slightly above the top edge of the holder 25, whereupon the holder with its setting so positioned is allowed to cool.

The dotted line extension of Fig. 1 illustrates the form in which the tool exists after the setting has been completed. When it is desired to use the tool the surplus seating material 27a, and the terminal edge 25a of the holder are ground, cut or otherwise removed to provide the structure as illustrated by the full line drawing, and the tool is thence ready for use. Provision is thus made, by which the stone 20 is secured within a heat conducting sheath 51, that has a substantial anchorage within the seating metal 27 by means of the stem or anchor 52, and that acts as a ready conductor for equalizing the temperature of the tool adjacent the working portions.

By the old methods of mounting, when tools of this character are used, the heat generated in close proximity to the stone is frequently of such temperature as to cause the softening, and in fact melting of the seating metal 27, closely adjacent the stone, and this softening gives rise to the movement of the stone within the seating metal. This movement of the stone acts as a ram or hammer to batter the soft metal, enlarging the cavity, which finally becomes efficient in size to allow extraction of the stone 20 therefrom. By the improved method of mounting and by use of the harness that has been disclosed, the heat that is usually generated at the base of the stone is conducted away by its sheath 51 and stem 52 so that the temperature of the seating metal 27 adjacent the stone does not rise to such a temperature as would allow the softening thereof and the consequent loss of the stone. Thus, there is a material saving in the cost and maintenance of tools of this character.

Figure 6:
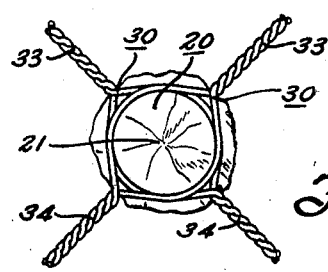
Fig. 6 illustrates in plan view a further modification of harnessing a stone preparatory to setting.

There has been illustrated in Fig. 6, a modification of the harnessing of the stone in which two of the harnesses 30, substantially as illustrated in Fig. 2, have been placed about the waist of the stone with their twisted ends 33 and 34 of one arranged at substantially right angles to the twisted portions 33 and 34 of the other. It is to be understood that all four of the twisted portions in this instance are bent backwardly on the base of the stone where they are twisted together similarly to form the stem 50 as illustrated in Fig. 5, and thence coated by the preferred process as disclosed hereinabove. Harnessing the stone in this manner makes it even more secure against loss, and presents a greater mass of metal for equalizing the temperautres of the tool.

While the form of embodiment of the present invention as herein disclosed, constitutes a preferred form, it is to be understood that other forms might be adopted, all coming within the scope of the claims which follow.

What is claimed is as follows:

1. The process of mounting a stone in a dressing tool comprising in combination, the steps of harnessing the stone to be set so as to provide a stem opposite the point to be exposed, electroplating the harnessed stone to provide a substantial coating of heat-conducting material, and substantially immersing the stone thus electroplated in a holder charged with molten metal of lower melting point than that of the electro-deposition.

2. The process of mounting stones in tools comprising the steps, harnessing the stone coating the stone and harness with metal by electro-deposition, cleaning the setting thus coated, immersing the coated portion in solder, and setting the stone and harness thus prepared in a preheated holder containing molten zinc.

3. The process of mounting stones in tools comprising the steps, of harnessing the stone to provide a stem of heat conducting metal substantially opposite the point of the stone, immersing the stone and the stem in a metal binding substance, and substantially immersing the harnessed stone in the recess of a holder charged with seating metal of less heat conductivity than the material of the stem in such manner that the free end of the stem is located closest to the recess bottom so that most of the heat generated during the use of the stone will be conducted to the body of the holder through the stem and the seating metal remote from the stone to prevent softening of the sealing metal adjacent the harnessed stone through which the stone might be lost.

4. In a stone pointed tool, the combination comprising a stone, a harness for the stone having heat conducting elements looped about the point of said stone with portions thereof merging into a stem substantially opposite of said point, said stone and harness having a coating of hard copper of integral formation providing a heat conductive sheath and stem about the base of said stone, and means for mounting the stone and heat conducting sheath in a holder, whereby heat generated near the stone during its use that would normally loosen the setting is thereby conducted to a region of the holder remote from said stone base whereby loss of the stone will be precluded.

5. In a stone setting for dressing tools the combination comprising a stone, a harness to secure the stone having looped elements of heat conductive wire disposed about the point of said stone and united on the remote side thereof to form a heat conductive stem, and a heat conductive holder having a recess filled with seating metal of less heat conductivity than the harness for receiving the stone, said recess having a greatly reduced portion for receiving the free end of the stem so that the same will conduct the heat of operation substantially through the seating metal adjacent said stem end to the walls of the reduced recess in the holder; whereby softening of the seating metal adjacent the stone will be prevented.

6. In a stone setting for dressing tools the combination comprising a stone, a wire harness having loops disposed about the stone and portions twisted together at the base to form a heat conductive stem substantially opposite the cutting point, and a sheath of heat conducting material integrally formed upon said stone and harness, whereby heat generated at or near the base of said stone will be readily conducted through said stem to a region remote from the stone.

7. In a stone setting for dressing tools, the combination comprising a stone, a harness substantially enclosing the stone, said harness having a plurality of heat conducting wires looped about the stone intermediate the point and base and twisted together to form other loops at substantial right angles to the first loops and disposed in planes substantially perpendicular to the plane of said first loops, said twisted loops being brought to the back of the stone or part remote from said point where they are twisted into a single stem of substantial magnitude, said stone base and harness being coated with heat conducting material by electro-deposition.

8. The process of mounting a stone in a dressing tool comprising in combination, the steps of harnessing the stone to be set so as to provide a stem opposite the point to be exposed, coating the harnessed stone to provide a substantial sheath of heat conducting material, and substantially immersing the stone thus coated in a holder charged with mounting metal of lower melting point than that of the coating.

DE NERA A. COTTON.